Patented June 6, 1950

2,510,776

UNITED STATES PATENT OFFICE 2,510,776

AIR-ENTRAINED CONCRETE AND METHOD OF MAKING

Carl Olof Gabrielson, Ornskoldsvik, Sweden, assignor to Mo och Domsjo Aktiebolag, Ornskoldsvik, Sweden, a corporation of Sweden No Drawing. Application December 6, 1948, Serial No. 63,850. In Sweden July 26, 1947

2 Claims. (Cl. 106—86)

This invention relates to hydraulic cement, concrete and mortar and more particularly to a concrete or mortar mix having enhanced plasticity and less tendency for the aggregate to separate from the cement and water.

A great number of compounds have been suggested as additions to a concrete mix in order to give the mix increased plasticity and to give the solidified concrete increased resistance to deterioration by repeated freezing and thawing. These compounds seem to act in the concrete mix by increasing the amount of air that enters during the mixing and by finely dispersing this air. The compounds of this kind are generally called "air-entraining agents" and the concrete produced by their aid "air-entrained concrete."

The improved plastic properties of an air-entrained concrete mix shows in better filling of the form at the pouring, in less tendency to separate water under iron parts or under the larger stones of the aggregate and as a consequence in increased strength of the solidified concrete construction. The strength of the construction is increased in spite of the fact that addition of air-entraining agents gives a somewhat decreased strength to concrete test cubes.

The use of tall oil has been suggested (U. S. Patent No. 2,420,144, J. G. Mark) as a concrete or mortar addition. However, tall oil has developed into a raw material for the production of fatty acids, rosin acids and other valuable products and as a consequence the price of tall oil has increased.

I have now found that tall oil pitch after treatment with alkali will form a substance that with advantage can be used as an air-entraining agent in concrete or mortar.

My invention relates to a concrete or mortar mix of enhanced plasticity comprising an hydraulic cement-aggregate, and not more than 0.1% by weight on the cement of alkali treated tall oil pitch produced by heating, at a temperature between 200° C. and 250° C. of tall oil pitch with a substance from the group consisting of alkali metal hydroxides and alkali metal carbonates in a quantity equivalent to the saponification number of said pitch for such a time that substantially all gaseous substances and water in the reaction mass are driven off.

Another object of my invention is the method of making a concrete or mortar, which comprises incorporating in a cement-aggregate mix, in the amount of not more than 0.1% by weight on the cement, an alkali treated tall oil pitch produced by heating, at a temperature between 200° C. and 250° C., tall oil pitch with a substance from the group consisting of alkali metal hydroxides and alkali metal carbonates in a quantity equivalent to the saponification number of said pitch for such a time that substantially all gaseous substances and water in the reaction mass are driven off.

Tall oil pitch is a commercially available material, the distillation residue from the vacuum distillation of tall oil to obtain fatty acids and resin acids or a mixture of both these kinds of acids. It is chemically different from tall oil.

Tall oil consists of fatty acids (mainly oleic acid, elaeic acid, linoleic acid, linolenic acid) resin acids (abietic acid, neoabietic acid, dehydroabietic acid, dihydroabietic acid, tetrahydroabietic acid, dextropimaric acid, isodextropimaric acid) phytosterol (about half as free alcohol and half as ester with fatty or resin acids) higher aliphatic alcohols such as lignoceryl alcohol (about half as free alcohol and half as ester) and some higher hydrocarbons. Tall oil pitch consists mainly of compounds formed during the distillation such as polymerised fatty and resin acids and fatty or resin acid esters of hydroxy fatty or hydroxy resin acids; esters of practically all phytosterol and aliphatic alcohols in the tall oil; also higher polycyclic hydrocarbons formed by condensation and decarboxylation of the tall oil acids.

The constants of tall oil pitch will vary somewhat depending on how the vacuum distillation of the tall oil is carried out. The acid number of various pitches may vary between 27 and 59 and the saponification number between 72 and 130.

When the pitch is treated with alkali at higher temperatures the acids of the pitch are neutralized and the esters of the pitch are at least partially saponified. Probably some other reactions also take place as is often the case when organic material is heated with alkali. The softening point of the alkali treated pitch increases as the amount of alkali increases.

The following table will illustrate this point:

Tall oil pitch of acid number 40, saponification number 118, and softening point (ring and ball method) 51° C.:

| Amount of sodium hydroxide added to the pitch | Softening point (ring and ball method) after heating at 225° C. for 45 minutes |
|---|---|
| | °C. |
| Equivalent to one-half of the acid number of the pitch | 79 |
| Equivalent to the acid number of the pitch | 153 |
| Equivalent to the arithmethic medium of the acid and saponification numbers of the pitch | 176 |
| Equivalent to the saponification number of the pitch | 195 |

It may be of advantage to add the sodium hydroxide in water solution but it can also be added in solid form. During the alkali treatment water vapor is given off by the mass, this water being formed by the neutralization of the acids in the pitch or having been added with the sodium hydroxide. As the mass under treatment has a tendency to foam it may be of advantage to stir the mass during the treatment or to treat the surface of the mass with a blast of hot air or other gas, or to use any other well known method to diminish the foaming of the mass under treatment.

The time and temperature of the treatment depends on the amount of alkali added and also on the foaming of the reaction mass. The temperature of treatment should exceed the softening temperature of the treated material with at least 10 to 20° C. The time is often determined by the rate of evaporation of water from the mass under treatment. 225° C. has been found to be a suitable temperature of treatment and might be said to be a preferred temperature, but temperatures as high as 250° C. have been used with no adverse effect on the material. At 225° C. the treatment can be carried through in one hour or less, if suitable means are taken in order to prevent the foaming of the mass. A longer time of treatment seems however to have no appreciable effect on the properties of the end product.

A suitable apparatus for the treatment is an open kettle, provided with stirrer, means of heating, means of temperature measurement and means of filling and emptying.

The pitch is usually added at a temperature about 100° C., where it can be poured and pumped. The alkali solution can be added at this temperature and the temperature of the mass raised afterwards or the alkali can be added slowly during the heating to the end temperature of the treatment. The heating should be continued at the end temperature until all water has evaporated and the mass has ceased to foam.

Instead of sodium hydroxide another alkali hydroxide can equally well be used. As sodium carbonate usually has lower price than sodium hydroxide it might be advantageous to use sodium carbonate up to an amount equivalent to the acid number of the pitch and add sodium hydroxide after the heating with the carbonate. Other alkali carbonates may be used instead of sodium carbonate.

The alkali treated tall oil pitch can be crushed and ground to a fine powder, that is easily soluble in water or dispersable in water. Usually it will not form a clear solution, but the major part of the material goes into solution and will keep the rest of the material dispersed in the solution for a long time. Even if a part of the dispersed particles in a solution of the material will settle to the bottom, this has no appreciable effect on the use of the material as a concrete addition because it is the water soluble part of the material that is active in the concrete mix.

The following examples are illustrative of my invention, although it is to be understood that I do not intend to limit myself particularly thereto:

Example 1

200 grams of tall oil pitch with the acid number 40, the saponification number 118 and the softening point 51° C. (ring and ball method) were melted in a vessel of the volume 0.5 liter, provided with a stirrer. The pitch was heated to 120° C. and an amount of sodium hydroxide, equivalent to the saponification number of the pitch, was added in the form of a water solution of 40% sodium hydroxide content. A thin stream of hot air (temperature about 225° C.) was blown against a spot on the surface of the molten mass in order to prevent excessive foaming. While the mass was stirred the temperature was increased to 225° C. during one hour, after which the temperature was held constant for another hour. During the latter period the molten mass ceased to foam, i. e. all gaseous substances and water were driven off. After cooling to room temperature a hard mass was obtained, that easily could be crushed and ground to a fine powder, soluble in water. The mass obtained had a softening point of 195° C. (ring and ball method).

Alkali treated tall oil pitch can be added in solid form to the cement clinker before or during the grinding to cement. It can also be added in solid form or in the form of a solution in water to the concrete mixer. The added amount of alkali treated tall oil pitch should not exceed 0.1% of the amount of cement in the cement-aggregate-water mix and in general an amount of about 0.01% of the cement is sufficient. The optimum amount may depend somewhat on the kind of aggregate and the kind and amount of water used and may be determined by experiments under the conditions actually prevailing. In general it is easier to measure a volume of solution of known concentration than to weigh a predetermined amount of solid powder to be added to the concrete mixer. As a result the addition of solution of the alkali treated tall oil pitch may be said to be the preferred method of operation.

Example 2

300 parts of Portland cement, 1917 parts of aggregate and the amount of water necessary to give a nearly constant consistency to the mixes were mixed with the addition of various amounts of alkali treated tall oil pitch, prepared according to Example 1. The following table gives the properties of the mixes together with the properties of the test cubes formed from the various mixes.

The values of the table show that an addition of 0.01% of alkali treated tall oil pitch gives an increase of between 2 and 3% of air in the concrete mix and in the solidified concrete. This is the desired increase in air content in air-entrained concrete. The addition of this amount of alkali treated tall oil pitch causes a decrease of about 15% in the compression breaking stress of the solidified concrete. This decrease is a normal effect accompanying the addition of air-entraining agents.

| Addition: Percent of the cement in the concrete mix | Parts of water in the mix | Consistency: Slump, measured in cm. | Wet concrete mix | | Concrete cubes 20 x 20 x 20 cm. after 28 days of storage | | Compression breaking stress, kgm./sq. cm. |
|---|---|---|---|---|---|---|---|
| | | | Volume weight, kgm./litre | Air content compared with concrete mix without additions | Volume weight kgm./litre | Air content compared with concrete without additions | |
| None | 189 | 6.5 | 2.49 | 0 | 2.41 | 0 | 464 |
| 0.01% alkali treated tall oil pitch | 177 | 7.0 | 2.40 | 3.6 | 2.35 | 2.5 | 395 |
|  | 183 | 6.5 | 2.40 | 3.6 | 2.36 | 2.1 | 401 |
| 0.03% alkali treated tall oil pitch | 183 | 8.0 | 2.36 | 5.2 | 2.29 | 5.0 | 334 |
|  | 177 | 8.0 | 2.35 | 5.6 | 2.26 | 6.2 | 309 |
| 0.10% alkali treated tall oil pitch | 174 | 7.5 | 2.23 | 10.4 | 2.20 | 8.7 | 267 |
|  | 174 | 7.0 | 2.23 | 10.4 | 2.23 | 7.5 | 282 |

What I claim is:

1. A concrete or mortar mix of enhanced plasticity comprising an hydraulic cement, aggregate and an appreciable amount of not more than 0.1% by weight of the cement, of alkali treated tall oil pitch produced by heating, at a temperature between 200° C. and 250° C. of tall oil pitch with a substance from the group consisting of alkali metal hydroxides and alkali metal carbonates in a quantity equivalent to the saponification number of said pitch for such a time that substantially all gaseous substances and water in the reaction mass are driven off.

2. The method of making a concrete or mortar, which comprises incorporating in a hydraulic cement-aggregate mix, an appreciable amount of not more than 0.1% by weight of the cement, an alkali treated tall oil pitch produced by heating, at a temperature between 200° C. and 250° C., tall oil pitch with a substance from the group consisting of alkali metal hydroxides and alkali metal carbonates in a quantity equivalent to the saponification number of said pitch for such a time that substantially all gaseous substances and water in the reaction mass are driven off.

CARL OLOF GABRIELSON.

REFERENCES CITED

The following references are of record in the file of this patent:

UNITED STATES PATENTS

| Number | Name | Date |
|---|---|---|
| 2,311,289 | Booth | Feb. 16, 1943 |
| 2,370,983 | Miller | Mar. 6, 1945 |
| 2,420,144 | Mark | May 6, 1947 |